(12) United States Patent
Liu et al.

(10) Patent No.: US 10,967,950 B2
(45) Date of Patent: Apr. 6, 2021

(54) EXHAUST ASSEMBLY FOR AEROSTAT, AND AEROSTAT

(71) Applicants: Dongguan Frontier Technology Institute, Dongguan (CN); SHENZHEN KUANG-CHI SPACE TECH. CO. LTD., Shenzhen (CN)

(72) Inventors: Ruopeng Liu, Shenzhen (CN); Lin Luan, Shenzhen (CN); Lei Zhao, Shenzhen (CN)

(73) Assignees: Dongguan Frontier Technology Institute, Dongguan (CN); SHENZHEN KUANG-CHI SPACE TECH. CO. LTD., Shenzhen (CN)

(*) Notice: Subject to any disclaimer, the term of this patent is extended or adjusted under 35 U.S.C. 154(b) by 583 days.

(21) Appl. No.: 15/870,815

(22) Filed: Jan. 12, 2018

(65) Prior Publication Data
US 2018/0134364 A1    May 17, 2018

Related U.S. Application Data

(63) Continuation of application No. PCT/CN2016/109112, filed on Dec. 9, 2016.

(30) Foreign Application Priority Data

Dec. 17, 2015  (CN) .......................... 201510963256.7

(51) Int. Cl.
*B64B 1/62*      (2006.01)
*F16K 31/528*    (2006.01)
(Continued)

(52) U.S. Cl.
CPC ................. *B64B 1/62* (2013.01); *F16K 1/22* (2013.01); *F16K 1/24* (2013.01); *F16K 1/32* (2013.01); *F16K 31/04* (2013.01); *F16K 31/5282* (2013.01)

(58) Field of Classification Search
CPC .................................... B64B 1/64; B64B 1/62
See application file for complete search history.

(56) References Cited

U.S. PATENT DOCUMENTS 1,532,396 A * 4/1925 Gammeter ................ B64B 1/64
                                                 137/522
5,106,052 A   4/1992 Datta et al.
(Continued)

FOREIGN PATENT DOCUMENTS

CN       101696667 A      4/2010
CN       102700703 A      10/2012
(Continued)

OTHER PUBLICATIONS

Extended European Search Report for corresponding European App. No. 16874792.1, dated Jul. 3, 2019, 7 pages.

*Primary Examiner* — Richard R. Green
(74) *Attorney, Agent, or Firm* — Armstrong Teasdale LLP

(57) ABSTRACT

The present disclosure provides an exhaust assembly for an aerostat, including a valve base (2) provided with a valve port (1), and a valve cover (3) that selectively covers the valve port (1), and further including: a motor driving mechanism and a transmission mechanism that are arranged on the valve base (2). The motor driving mechanism propels the transmission mechanism to drive the valve cover (3) to selectively cover the valve port (1). When the valve cover (3) is in a position where the valve port (1) is open, the valve cover (3) is arranged at an angle with respect to a plane at which the valve port (1) is located. A purpose of the present disclosure is to provide the exhaust assembly that is for an aerostat and whose exhausting pressure can be flexibly adjusted, and an aerostat provided with the exhaust assembly.

11 Claims, 2 Drawing Sheets

(51) Int. Cl.
*F16K 1/24* (2006.01)
*F16K 1/22* (2006.01)
*F16K 31/04* (2006.01)
*F16K 1/32* (2006.01)

(56) References Cited

U.S. PATENT DOCUMENTS

2003/0136930 A1  7/2003  Dowden et al.
2004/0187844 A1  9/2004  Torii et al.

FOREIGN PATENT DOCUMENTS

| | | | |
|---|---|---|---|
| CN | 103672134 A | 3/2014 | |
| CN | 103687789 A | 3/2014 | |
| CN | 103711977 A | 4/2014 | |
| CN | 104029812 A | 9/2014 | |
| CN | 104819311 A | 8/2015 | |
| CN | 105065685 A | 11/2015 | |
| CN | 105129067 A | 12/2015 | |
| EP | 2428446 A2 | 3/2012 | |
| EP | 2873607 B1 * | 5/2016 | ............... B64B 1/64 |
| KR | 20130116624 A | 10/2013 | |

* cited by examiner

EXHAUST ASSEMBLY FOR AEROSTAT, AND AEROSTAT

CROSS REFERENCE TO RELATED APPLICATIONS

This application is a continuation of PCT Application No. PCT/CN2016/109112 filed on Dec. 9, 2016, which claims priority to Chinese Patent Application No. 201510963256.7 of Dec. 17, 2015, both of which are incorporated herein by reference.

TECHNICAL FIELD

The present disclosure relates to the aerostat technical field, and specifically, relates to an exhaust assembly for an aerostat, and an aerostat installed with the exhaust assembly.

BACKGROUND

Aerostats generally include balloons and airships. A shaped aerostat lifts off from the ground. As a flight height increases, external air density and atmospheric pressure gradually decrease, and a volume of lifting gas inside the aerostat expands rapidly. For the sake of safety and to maintain an aerodynamic configuration of the aerostat, some gas in the aerostat needs to be exhausted, to adjust a difference between the internal and external pressure to a specific range. The range is determined by a material strength, a flight strategy, and an aerodynamic parameter. Even if the aerostat is anchored on the ground or flies at a specific height, gas in the aerostat also expands as an ambient temperature increases. In this case, some gas needs to be exhausted. Otherwise, a body of the aerostat cracks due to excessive pressure. Therefore, the aerostat needs an exhaust apparatus to maintain the difference between the internal and external pressure within the specific range when being anchored on the ground, lifting off after taking shape, and floating in the air.

A conventional exhaust valve includes a valve body, a valve cover, a spring, and a pull rod. The valve cover of the exhaust valve is closed by using elastic pull force of the spring. When pressure of gas in the aerostat increases, a force of the internal pressure on the valve cover is greater than preset elastic pull force of the spring, and the valve cover is opened, to exhaust gas; then, the internal pressure decreases, and the valve cover is closed under the action of the spring; and so forth. Using this type of exhaust valve mainly brings the following problem: passive control, lacking flexibility. This is because the valve cover is of a pure mechanical structure, and it relies solely on an action of the spring and the internal atmospheric pressure to open or close the valve cover. When the atmospheric pressure is large, the valve cover is opened; and when the atmospheric pressure is small, the valve cover is closed. The valve cover cannot be actively controlled to open or close, lacking flexibility and resulting in a narrow range of application.

SUMMARY

To address the problem in the relevant technology, a purpose of the present disclosure is to provide an exhaust assembly that is for an aerostat and whose exhausting pressure can be flexibly adjusted, and an aerostat provided with the exhaust assembly.

To achieve the foregoing purpose, according to a first aspect, the present disclosure provides an exhaust assembly for an aerostat, including a valve base provided with a valve port, and a valve cover that selectively covers the valve port, and further including: a motor driving mechanism and a transmission mechanism that are arranged on the valve base. The motor driving mechanism propels the transmission mechanism to drive the valve cover to selectively cover the valve port. When the valve cover is in a position where the valve port is opened, the valve cover is arranged at an angle with respect to a plane at which the valve port is located.

According to the present disclosure, when the valve cover is in a position where the valve cover covers the valve port, a plane at which the valve cover is located is parallel to the plane at which the valve port is located; and when the valve cover is in the position where the valve port is open, a plane at which the valve cover is located is vertical to the plane at which the valve port is located.

According to the present disclosure, the motor driving mechanism includes a motor, and the motor has an output shaft that is connected to the transmission mechanism.

According to the present disclosure, the transmission mechanism includes: a shifting fork connected to the output shaft and that rotates when driven by the output shaft; a first interlocking shaft that is slidably arranged in a guide slot of the shifting fork, where the first interlocking shaft is connected to the valve cover by using a connection shaft; and a sliding slot that guides the first interlocking shaft to drive the valve cover to switch between the opening location and the covering location.

According to the present disclosure, a sliding slot base is installed on the valve base, the sliding slot is arranged on the sliding slot base, and the sliding slot base extends from a plane at which the valve base is located to a side on which the motor driving mechanism is arranged.

According to the present disclosure, the sliding slot is configured as an L-shaped sliding slot structure, and an extension direction of one slot of the L-shaped sliding slot structure is vertical to the plane at which the valve port is located.

According to the present disclosure, a round chamfer is provided in a position where two slots of the L-shaped sliding slot structure intersect.

According to the present disclosure, the transmission mechanism further includes a second interlocking shaft that is associated with the first interlocking shaft, the second interlocking shaft is arranged between the first interlocking shaft and the valve cover, and the connection shaft that connects the first interlocking shaft and the valve cover extends through the second interlocking shaft.

According to the present disclosure, an O-shaped sealing ring is arranged on an outer periphery of the valve cover.

According to the present disclosure, the O-shaped sealing ring is a metal sealing ring.

According to the present disclosure, the connection shaft includes a screw and a nut, the screw passes through the first interlocking shaft and the valve cover in sequence, and the nut is threadedly connected to the screw so that the first interlocking shaft and the screw are securely connected.

According to the present disclosure, the motor driving mechanism further includes a decelerator connected between the motor and the output shaft.

According to the present disclosure, the valve base is constructed in a flange-shaped structure.

According to the present disclosure, installation holes are evenly arranged on an outer edge of the valve base.

According to another aspect, the present disclosure further provides an aerostat, where the aerostat is installed with the foregoing exhaust assembly.

The beneficial effects of the present disclosure are as follows:

In comparison with the prior art in which a pure mechanical structure relies solely on an action of a spring and internal atmospheric pressure to open or close a valve cover, in the exhaust assembly in the present disclosure, the motor is used to drive the valve cover to open or close, thereby ensuring that exhausting pressure can be automatically and flexibly adjusted.

Further, in the present disclosure, the valve cover of the exhaust assembly uses an integrated vertical plus rotating open-close method. In this way, when the valve cover is open to exhaust gas from the aerostat, the plane at which the valve cover is located is arranged at an angle with respect to the plane at which the valve port is located, and further, the two may be arranged in a mutually vertical manner, so that outflow gas is not blocked, thereby improving exhausting efficiency.

Moreover, in the present disclosure, an O-shaped metal sealing ring is installed on the periphery of the valve cover, to ensure sealing performance of the valve cover in repeated use and special environmental conditions such as low temperature.

DESCRIPTION OF EMBODIMENTS

Figure 1:
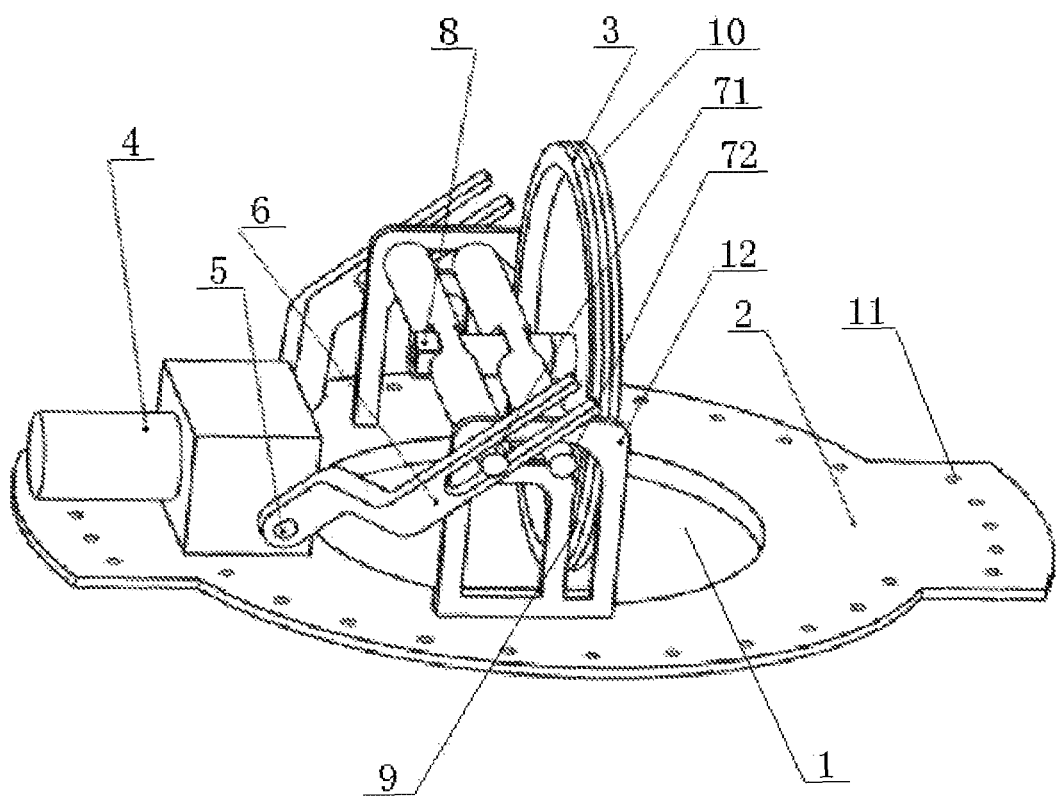
FIG. 1 is an isometric view of an exhaust assembly, in which a valve cover is opened, according to an embodiment of the present disclosure.
Figure 2:
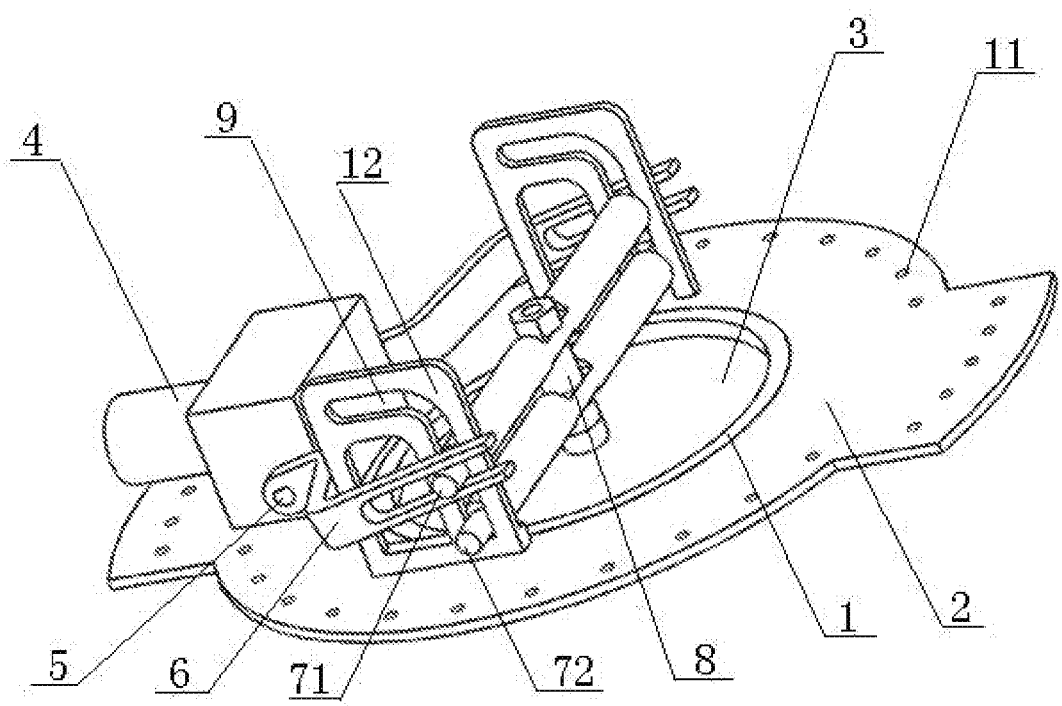
FIG. 2 is an isometric view of the exhaust assembly, in which the valve cover is closed, according to the embodiment of the present disclosure.

Specific embodiments of the present disclosure are described with reference to the accompanying drawings. FIG. 1 and FIG. 2 respectively show isometric views of an exhaust assembly, in which a valve cover 3 is opened and valve cover 3 closed according to embodiments of the present disclosure.

In an embodiment shown in FIG. 1, an exhaust assembly for an aerostat includes a valve base 2 and a valve cover 3. The valve base 2 has a circular valve port 1. A shape of the valve cover 3 is corresponding to that of the valve port 1. The valve cover 3 can cover the valve port 1. The exhaust assembly further includes a motor driving mechanism and a transmission mechanism that are arranged on the valve base 2. The motor driving mechanism propels the transmission mechanism to drive the valve cove 3 to selectively cover the valve port 1. That is, when the exhaust assembly needs to exhaust gas, the motor driving mechanism drives, by using the transmission mechanism, the valve cover 3 to open; and when gas exhausting is completed, the motor driving mechanism drives, by using the transmission mechanism, the valve cover 3 to cover the valve port 1, thereby implementing valve closure. Further, when the valve cover 3 is in a position where the valve port 1 is open, the valve cover 3 is arranged at an angle with respect to a plane at which the valve port 1 is located. That is, in a process in which the valve cover 3 switches from the position where the valve port 1 is closed to the position where the valve port 1 is opened, the valve cover 3 goes through a rotation process, which is different from the prior art in which only a linear rise-and-fall process exists. Therefore, adjustment of the valve cover 3 in the present disclosure is more flexible.

It should be noted herein that the motor driving mechanism driving, by using the transmission mechanism, the valve cover 3 to selectively cover the valve port 1 may be implemented in multiple manners. For example, a motor fixed on the valve cover 3 may be used to transmit, by using an output shaft 5, driving force to a shifting fork 6 connected to the output shaft 5, to drive the shifting fork 6 to rotate; then the shifting fork 6 drives, by using a interlocking shaft 71 that is connected to the valve cover 3, the valve cover 3 to move, thereby implementing opening and closing of the valve cover 3. For another example, a telescopic rod can be located on two sides or in the middle of the interlocking shaft 71, instead of the shifting fork 6. This may also implement opening and closing of the valve cover 3. Alternatively, an electromagnet may be used to control opening and closing of the valve cover 3. The foregoing is merely some preferred implementations in which the motor driving mechanism and the transmission mechanism in the exhaust assembly of the present disclosure cooperate to implement automatic control of opening and closing of the valve cover 3. Other manners that may achieve the foregoing effects are also applicable to the present disclosure, and may be determined according to an actual situation. The present disclosure is not limited thereto. In comparison with the prior art in which a pure mechanical structure relies solely on an action of a spring and internal atmospheric pressure to open or close a valve cover, in the exhaust assembly in the present disclosure, the motor is used to drive the valve cover to open or close, thereby ensuring that exhausting pressure can be automatically and flexibly adjusted.

Preferably, in the embodiments shown in FIG. 1 and FIG. 2, as optimally shown in FIG. 2, when the valve cover 3 is in a position where the valve cover 3 covers the valve port 1, that is, when atmospheric pressure in a balloon of an aerostat is appropriate, gas does not need to be exhausted, and the valve cover 3 is closed, a plane at which the valve cover 3 is located is parallel to the plane at which the valve port 1 is located. It may also be understood that the valve cover 3 is parallel to the valve base 2 when the valve cover 3 is at a closing location. As optimally shown in FIG. 1, when the valve cover 3 is in a position where the valve port 1 is open, that is, when atmospheric pressure in the balloon of the aerostat is too high, gas needs to be exhausted, and the valve cover 3 is opened (excluding statuses of the valve cover 3 during a process of moving from the closing location to a final opening location), a plane at which the valve cover 3 is located is vertical to the plane at which the valve port 1 is located. It may also be understood that the valve cover 3 is vertical to the valve base 2 when the valve cover 3 is at the final opening location.

In comparison with the present disclosure, in a valve in the prior art, the valve cover and a screw rod are securely connected to each other, and the valve cover and the screw rod can do a straight motion only, that is, can rise and fall vertically (perpendicularly) only. Therefore, the valve cover has a certain blocking effect on the outflow gas when an exhaust apparatus opens the valve cover, thereby slowing down a gas exhausting speed. However, in the embodiments of the exhaust assembly of the present disclosure, when the valve cover is opened for exhausting gas in the aerostat, the plane at which the valve cover is located is vertical to the plane at which the valve port is located, so that outflow gas is not blocked, thereby improving exhausting efficiency.

Specifically, as shown in FIG. 1, the motor driving mechanism includes a motor 4. The motor 4 has an output shaft 5 that is connected to the transmission mechanism, and the output shaft 5 is configured to transmit movement energy from the motor to the transmission mechanism.

In the embodiment shown in FIG. 1, the transmission mechanism of the exhaust assembly includes: a shifting fork 6 connected to the output shaft 5, where the shifting fork 6 rotates when driven by the output shaft 5; a first interlocking shaft 71 that is connected to the valve cover 3 by using a connection shaft 8 arranged in the center of the valve cover 3, where two ends of the first interlocking shaft 71 is slidably arranged in a guide slot of the shifting fork 6; and a sliding slot 9 that guides the first interlocking shaft 71 to drive the valve cover 3 to switch between the opening location and the covering location.

Specifically, the sliding slot 9 may be arranged in a sliding slot base 12. As shown in FIG. 1, the sliding slot base 12 may be an independent component, and may be installed on a location on two sides of the valve port 1 on valve base 2. In addition, two sliding slot bases 12 arranged on the two side of the valve port 1 are parallel with each other. Alternatively, the sliding slot base 12 extends from the valve base 2 to a side on which the motor 4 is arranged, and is integrally formed with the valve base 2.

In a preferred embodiment, the sliding slot 9 is configured as an L-shaped sliding slot structure. That is, the sliding slot 9 has two slots whose extension directions are approximately perpendicular. In addition, the extension direction of one of the slots is vertical to the plane at which the valve port 1 is located, and the extension direction of the other one of the slot is parallel to the plane at which the valve port 1 is located. More preferably, to make the interlocking shaft slide more smoothly in the sliding slot 9, a round chamfer is provided in a position where the two slots of the L-shaped sliding slot structure intersect. It should be noted herein that although in this embodiment, although the sliding slot 9 is configured as an L shape, other shapes of the sliding slot 9, such as a circular arc, that can achieve a same effect are also applicable to the present disclosure, and need to be determined according to an actual situation. The present disclosure is not limited thereto.

In another embodiment of the present disclosure, the exhaust assembly further includes a second interlocking shaft 72 associated with the first interlocking shaft 71. The "association" may refer to that the second interlocking shaft 72 may always maintain synchronous movement as the first interlocking shaft 71. Preferably, the second interlocking shaft 72 is also motionless relative to the first interlocking shaft 71 while maintaining synchronous movement as the first interlocking shaft 71. The second interlocking shaft 72 may be arranged in a position between the first interlocking shaft 71 and the valve cover 3, and the connection shaft 8 connected to the first interlocking shaft 71 and the valve cover 3 extends through the second interlocking shaft 72. In other words, the connection shaft 8 passes through and connects the first interlocking shaft 71, the second interlocking shaft 72, and the valve cover 3 in sequence.

The connection shaft 8 may connect the first interlocking shaft 71 and the valve cover 3 as an independent component in a form in which a nut and a screw coordinate. Specifically, the connection shaft 8 may include a screw and a nut. The screw passes through the first interlocking shaft 71 and the valve cover 3 in sequence, and the nut is threadedly connected to the screw so that the first interlocking shaft 71 and the screw are securely connected. Alternatively, the connection shaft 8 may be integrally formed with the valve cover 3, and formed by extending from a central location of the valve cover 3.

Preferably, an O-shaped sealing ring 10 is arranged on an outer periphery of the valve cover 3. More preferably, the O-shaped sealing ring 10 is a metal sealing ring. In comparison with the present disclosure, in the prior art, a valve cover is sealed by using a sealing pad, preset force of a spring is relatively small compared to sealing pressure and is unstable. Therefore, sealing performance cannot be ensured. When pressure of a balloon is close to the preset force of the spring, a sealing effect is poor, and precision of the spring is low in repeated use. This is unfavorable for overall arrangement of pressure control. However, in the exhaust assembly in the present disclosure, when the valve cover is closed, the O-shaped metal sealing ring 10 on the outer periphery of the valve cover deforms after being squeezed by the valve port 1, thereby achieving a good sealing effect. In addition, the metal sealing ring may ensure sealing performance of the valve cover in repeated use and special environmental conditions such as low temperature.

In addition, the motor driving mechanism in the exhaust assembly of the present disclosure may further include a decelerator connected between the motor 4 and the output shaft 5. The decelerator is configured to output an appropriate rotation speed to the output shaft 5.

Moreover, in the exhaust assembly of the present disclosure, the valve base 2 is constructed in a flange-shaped structure. Multiple installation holes 11 are arranged at a same interval on an outer edge of the valve base 2 that is in a flange-shaped structure, and are configured to install the valve base 2 on an aerostat.

In summary, in the embodiments of the exhaust assembly of the present disclosure shown in FIG. 1 and FIG. 2, a specific working process is as follows: To open the valve cover 3, the motor 4 works, the output shaft 5 drives the shifting fork 6 to rotate, the first interlocking shaft 71 does a straight motion, driven by the shifting fork 6, along the sliding slot 9, the second interlocking shaft 72 is simultaneously driven to do a straight motion in the sliding slot 9, and the valve cover 3 does a straight motion driven by the connection shaft 8, to depart from the valve port 1; when the first interlocking shaft 71 reaches a round chamfer segment of the sliding slot 9, the first interlocking shaft 71 and the second interlocking shaft 72 do a translational motion and rotate as a whole, to drive the valve cover 3 to do a translational motion and rotate; and when the first interlocking shaft 71 reaches a terminal of a horizontal straight line segment of the sliding slot 9, the valve cover 3 rotates to a location vertical to the valve base 2, the motor stops working, and the valve cover 3 is completely opened. The valve cover 3 is opened and closed in a similar way. The valve cover 3 does a translational and rotational motion under the action of the first interlocking shaft 71 and the second interlocking shaft 72; when the first interlocking shaft 71 and the second interlocking shaft 72 both reaches a vertical straight line segment of the sliding slot 9, the valve cover 3 becomes parallel to the valve base 2, and then does a straight motion; when the second interlocking shaft 72 reaches a terminal of the vertical straight line segment of the sliding slot 9, the O-shaped metal sealing ring 10 on the valve cover 3 is squeezed into the valve port 1, the motor 4 stops working, and the valve cover 3 is completely closed.

Only preferred embodiments of the present disclosure are described above, and they are not intended to limit the present disclosure. For a person of ordinary skill in the art, the present disclosure may have various medications and changes. All modifications, equivalent substitutions and improvements without departing from the spirit and principle of the present disclosure fall within the protection scope of the present disclosure.

We claim:

1. An exhaust assembly for an aerostat, comprising a valve base (2) provided with a valve port (1), and a valve cover (3) that selectively covers the valve port (1), and further comprising:
   a motor driving mechanism and a transmission mechanism that are arranged on the valve base (2), wherein the motor driving mechanism propels the transmission mechanism to drive the valve cover (3) to selectively cover the valve port (1), and
   when the valve cover (3) is in a position where the valve port (1) is open, the valve cover (3) is arranged at an angle with respect to a plane at which the valve port (1) is located, when the valve cover (3) is in a position where the valve cover (3) covers the valve port (1), a plane at which the valve cover (3) is located is parallel to the plane at which the valve port (1) is located; and when the valve cover (3) is in the position where the valve port (1) is open, a plane at which the valve cover (3) is located is vertical to the plane at which the valve port (1) is located, the motor driving mechanism comprises a motor (4), and the motor (4) has an output shaft (5) that is connected to the transmission mechanism, wherein the transmission mechanism comprises:
   a shifting fork (6) that is connected to the output shaft (5) and that rotates when driven by the output shaft (5);
   a first interlocking shaft (71) that is slidably arranged in a guide slot of the shifting fork (6), wherein the first interlocking shaft (71) is connected to the valve cover (3) by using a connection shaft (8);
   a sliding slot (9) that guides the first interlocking shaft (71) to drive the valve cover (3) to switch between the opening location and the covering location; and
   a second interlocking shaft (72) that is associated with the first interlocking shaft (71), the second interlocking shaft (72) is arranged between the first interlocking shaft (71) and the valve cover (3), and the connection shaft (8) that connects the first interlocking shaft (71) and the valve cover (3) extends through the second interlocking shaft (72), the second interlocking shaft (72) is slidably disposed in the sliding slot (9).

2. The exhaust assembly for an aerostat according to claim 1, wherein a sliding slot base (12) is installed on the valve base (2), the sliding slot (9) is arranged on the sliding slot base (12), and the sliding slot base (12) extends from a plane at which the valve base (2) is located to a side on which the motor driving mechanism is arranged.

3. The exhaust assembly for an aerostat according to claim 1, wherein the sliding slot (9) is configured as an L-shaped sliding slot structure, and an extension direction of one slot of the L-shaped sliding slot structure is vertical to the plane at which the valve port (1) is located.

4. The exhaust assembly for an aerostat according to claim 3, wherein a round chamfer is provided in a position where two slots of the L-shaped sliding slot structure intersect.

5. The exhaust assembly for an aerostat according to claim 1, wherein an O-shaped sealing ring (10) is arranged on an outer periphery of the valve cover (3).

6. The exhaust assembly for an aerostat according to claim 5, wherein the O-shaped sealing ring (10) is a metal sealing ring.

7. The exhaust assembly for an aerostat according to claim 1, wherein the connection shaft (8) comprises a screw and a nut, the screw passes through the first interlocking shaft (71) and the valve cover (3) in sequence, and the nut is threadedly connected to the screw so that the first interlocking shaft (71) and the screw are securely connected.

8. The exhaust assembly for an aerostat according to claim 1, wherein the motor driving mechanism further comprises a decelerator connected between the motor (4) and the output shaft (5).

9. The exhaust assembly for an aerostat according to claim 1, wherein the valve base (2) is constructed in a flange-shaped structure.

10. The exhaust assembly for an aerostat according to claim 9, wherein installation holes (11) are evenly arranged on an outer edge of the valve base (2).

11. An aerostat, wherein the aerostat is installed with the exhaust assembly according to claim 1.

* * * * *